March 13, 1928.
J. P. BALL
1,662,356
VIBRATION INDICATING MEANS
Filed Jan. 5, 1927
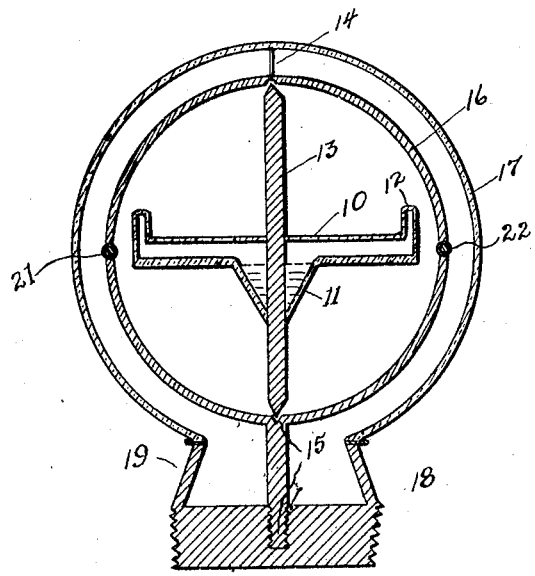
Figure, 1.
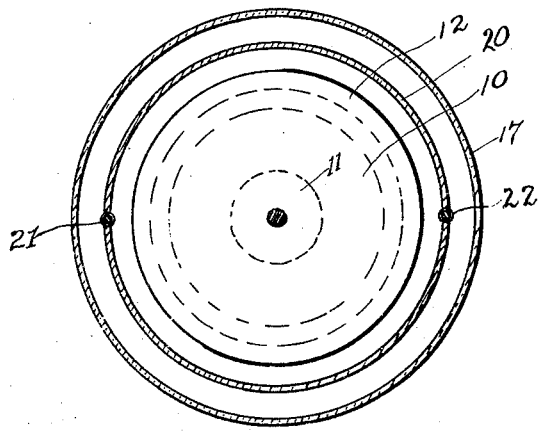
Figure, 2.
Inventor,
John P. Ball.

Patented Mar. 13, 1928.

1,662,356

UNITED STATES PATENT OFFICE.

JOHN P. BALL, OF CHICAGO, ILLINOIS.

VIBRATION-INDICATING MEANS.

Application filed January 5, 1927. Serial No. 159,225.

My invention relates to means for detecting and indicating vibration resulting from an unbalanced condition of a motor or engine and more particularly of the revolving shaft or element of the motor; my improved means involving a rotatably mounted element arranged in a suitable housing, preferably of glass or other transparent material in order that the condition of the rotating element may be ascertained while at the same time the rotatable element cannot be affected by the outer air currents. The invention also involves means whereby the degree or extent of rotation of the element and therefore the degree of detected vibratory movement will be indicated and measured as shown later.

In the drawing—

Figure 1 is a vertical sectional view of one form of my invention.

Figure 2 is a horizontal sectional view.

In the particular exemplification of the invention, 10 denotes a rotating element or wheel preferably in the nature of a hollow disk of suitable material having a cup portion 11 at the center or hub, while the perimeter or rim of the wheel is preferably shown enlarged toward one side of the disc as at 12. This enlarged rim or felly, in the particular exemplification, is made of transparent material or glass in order that the contents of the hollow wheel or disc may be visible at the rim or felly during certain conditions or moments of operation of the rotating element. The hub or cup portion 11, which, in the particular exemplification is disposed toward one side of the disc or wheel is intended to receive a suitably colored fluid, which, when the rotor or disc is not in motion will be entirely contained within the hub or cup portion 11 and therefore will not be visible at the felly or rim of the wheel.

Of course, the entire wheel may be of glass or other suitable transparent material if desired and the exact configuration may be altered; it being essential, however, to permit perfect balancing of the wheel.

The wheel or disc 10 is rigidly secured to a spindle 13 intermediate of the ends of the latter and the ends of the spindle 13 in turn are provided with suitable bearings at 14, 15 formed at diametrically opposite points of an encircling frame 16. The frame 16 is preferably employed for reenforcing and maintaining the bearing points in proper relation and position and may consist of a suitable ring as shown in the drawing. The frame in turn is shown suspended held within an outer enclosure or housing 17 by means of the bearing 14 and 15. In the exemplification, the bearing 15 is shown mounted in the closure member 18 of the housing 17; the latter being conveniently shown in the nature of an inverted glass bowl having the neck portion 19 of size sufficient to permit introduction of the supporting frame 16 with the rotor or disc. The housing 17 is, as stated, preferably of glass in order that the elements within are visible and a closure member is employed so as to prevent air currents coming into contact with the rotor or disc.

I have found from experiments, that in placing the housing on or against an operating motor, for example an electric motor wherein the armature or shaft is out of balance, and therefore vibration is set up, that the well balanced disc or wheel 10 will begin rotating; the speed of rotating being commensurate with the degree of vibration or extent of non-balanced condition of the rotating shaft or armature.

With the cupped hub 11 of the hollow disc or wheel 10 filled with a suitably colored fluid, rotation of the disc or wheel 10 at a certain speed will cause the colored fluid to be thrown outwardly toward the perimeter of the disc or wheel and therefore into the enlarged felly or rim 12 where it will be visible through the transparent side of the rim and, of course, visible through the glass or transparent housing or enclosure 17.

It will be understood, of course, that the pivot points of the spindle of the wheel must be such as to present as little friction as possible and allow free rotation of the disc or wheel when the latter is subjected to the vibrations transferred thereto through the enclosure or housing placed on the motor or engine to be tested. The extent to which the colored fluid is thrown into the rim of the wheel will indicate the speed of rotation of the disc or wheel and therefore the amount of vibratory movement and consequently the degree to which the rotating shaft or armature is unbalanced.

It is apparent that other means may be employed instead of the colored fluid, which is affected by rotation of the disc or wheel for indicating the extent of vibratory movement; and that the spindle or axis of the disc or wheel 10 may be disposed at right angles to the closure member 18, while at the same time any suitable shape of housing may be employed.

The bearing 14 is shown as a fine wire and is employed as a steadying member to the supporting frame 16, the main bearing being at 15 which is fixed to the base 18 and carries the supporting member 16. In actual tests to discover slight unbalanced condition of shafts or rotating engines the bearing 14 may be dispensed with, as it is found that the indicator wheel 10 will respond more quickly with one bearing as at 15.

The vertical frame 16 is reinforced by a horizontal encircling frame 20 and fastened thereto at connecting points 21 and 22.

I claim:

1. Vibration indicating means comprising a housing closed against ingress of air currents and a balanced element rotatably mounted in said housing.

2. Vibration indicating means comprising a transparent housing closed against ingress of air currents, a balanced element having a spindle disposed toward opposite sides, and bearings for both ends of the spindle.

3. Vibration indicating means comprising a housing, a balanced element provided with a spindle disposed beyond opposite sides at the axis of the element, bearings at diametrically opposite points in the housing for the ends of the spindle, and means adapted to be moved by rotation of said element.

4. Vibration indicating means, comprising a housing closed against ingress of air currents, a balanced hollow member rotatably mounted in said housing, the outer perimeter of said member being transparent, while the hub of said member is formed to provide a chamber, and a predetermined quantity of fluid in said chamber adapted to flow toward the perimeter of the member when the latter rotates.

5. Vibration indicating means comprising a transparent housing closed against ingress of air currents, a balanced hollow wheel provided with a spindle extending beyond both sides of the wheel, bearings in the housing for said spindle, and an indicating fluid in said hollow wheel adapted to be affected by rotation of said wheel.

JOHN P. BALL.